(12) United States Patent
Ellingsrud et al.

(10) Patent No.: US 9,097,816 B2
(45) Date of Patent: Aug. 4, 2015

(54) APPARATUS FOR DETECTING LOW FREQUENCY ELECTROMAGNETIC FIELD RESPONSES FROM A SUBSURFACE ENVIRONMENT

(75) Inventors: Svein Ellingsrud, Trondheim (NO);
Hans Roger Jensen, Trondheim (NO);
Geir Bjarte Havsgard, Jakobsli (NO)

(73) Assignee: ELECTROMAGNETIC GEOSERVICES ASA, Trondheim (NO)

( * ) Notice: Subject to any disclaimer, the term of this patent is extended or adjusted under 35 U.S.C. 154(b) by 317 days.

(21) Appl. No.: 13/809,146

(22) PCT Filed: Jul. 7, 2011

(86) PCT No.: PCT/EP2011/061514
§ 371 (c)(1),
(2), (4) Date: Apr. 18, 2013

(87) PCT Pub. No.: WO2012/004345
PCT Pub. Date: Jan. 12, 2012

(65) Prior Publication Data
US 2013/0207661 A1    Aug. 15, 2013

(30) Foreign Application Priority Data
Jul. 8, 2010  (GB) .................................. 1011548.3

(51) Int. Cl.
*G01V 3/12*  (2006.01)
*G01D 5/353*  (2006.01)
(52) U.S. Cl.
CPC .............. *G01V 3/12* (2013.01); *G01D 5/35303* (2013.01); *G01D 5/35338* (2013.01)

(58) Field of Classification Search
USPC ........................................................ 324/365
See application file for complete search history.

(56) References Cited

U.S. PATENT DOCUMENTS

| | | | |
|---|---|---|---|
| 5,396,166 A | 3/1995 | Vohra et al. |
| 5,404,064 A | 4/1995 | Mermelstein et al. |
| 6,314,056 B1 | 11/2001 | Bunn et al. |
| 6,628,119 B1 | 9/2003 | Eidesmo et al. |
| 6,696,839 B2 | 2/2004 | Ellingsrud et al. |
| 6,717,411 B2 | 4/2004 | Ellingsrud et al. |
| 6,859,038 B2 | 2/2005 | Ellingsrud et al. |
| 6,864,684 B2 | 3/2005 | Ellingsrud et al. |
| 6,900,639 B2 | 5/2005 | Ellingsrud et al. |
| 7,026,819 B2 | 4/2006 | Eidesmo et al. |
| 7,038,456 B2 | 5/2006 | Ellingsrud et al. |
| 7,126,338 B2 | 10/2006 | MacGregor et al. |
| 7,145,341 B2 | 12/2006 | Ellingsrud et al. |
| 7,202,669 B2 | 4/2007 | Ellingsrud et al. |

(Continued)

FOREIGN PATENT DOCUMENTS

| | | |
|---|---|---|
| GB | 2 381 137 A | 4/2003 |
| GB | 2 450 158 A | 12/2008 |

(Continued)

*Primary Examiner* — Jay Patidar
(74) *Attorney, Agent, or Firm* — Patterson Thuente Pedersen, P.A.

(57) ABSTRACT

An EM receiver instrument suitable for making underwater electric field measurements. The EM receiver comprises a dipole antenna; an AM modulator for applying modulation to a signal detected by the antenna; a fiber-optic voltage sensor and an application of AM demodulator for applying demodulation to the signal. The fiber-optic sensor may be an interferometric voltage sensor or a phase sensitive voltage sensor.

18 Claims, 7 Drawing Sheets

(56) References Cited

U.S. PATENT DOCUMENTS

| | | |
|---|---|---|
| 7,319,330 B2 | 1/2008 | Amundsen |
| 7,423,432 B2 | 9/2008 | Amundsen |
| 7,567,084 B2 | 7/2009 | Eidesmo et al. |
| 7,919,965 B2 | 4/2011 | Schaug-Pettersen et al. |
| 8,188,748 B2 | 5/2012 | Schaug-Pettersen |
| 8,228,066 B2 | 7/2012 | Ellingsrud et al. |
| 2009/0058422 A1 | 3/2009 | Tenghamn et al. |
| 2009/0091765 A1* | 4/2009 | Chow et al. ............... 356/477 |
| 2010/0045296 A1 | 2/2010 | Tenghamn |
| 2010/0061187 A1 | 3/2010 | Sodal |

FOREIGN PATENT DOCUMENTS

| | | |
|---|---|---|
| WO | WO 01/57555 A1 | 8/2001 |
| WO | WO 2010/069055 A1 | 6/2010 |

* cited by examiner

APPARATUS FOR DETECTING LOW FREQUENCY ELECTROMAGNETIC FIELD RESPONSES FROM A SUBSURFACE ENVIRONMENT

RELATED APPLICATIONS

The present application is a National Phase entry of PCT Application No. PCT/EP2011/061514, filed Jul. 7, 2011, which claims priority from Great Britain Application No. 1011548.3, filed Jul. 8, 2010, the disclosures of which are hereby incorporated by reference in their entireties.

FIELD OF THE INVENTION

The present invention relates to electromagnetic (EM) field data acquisition. In particular, the invention relates to a device for detecting low frequency EM field responses from a subsurface, especially in a submarine environment.

BACKGROUND

Geophysical exploration using EM fields is an established technique for determining whether or not a subsurface may contain a hydrocarbon-containing reservoir. Such a technique may be referred to as Sea Bed Logging (SBL) or, more generally, controlled source electromagnetic measurement (CSEM). WO 01/57555 describes basic aspects of the SBL technique.

EM exploration is a stand-alone technique providing a direct indicator for hydrocarbon reservoirs, and is complementary to seismic methods of exploration. By combining both seismic and EM methods, reservoirs can be identified with improved probability compared to one method alone.

Today, EM surveys are normally done by deploying a number of vector magnetic and electric field receivers known as nodes on the sea bed to form a two dimensional array. By towing an EM transmitter close to the sea bed, in proximity to the receiver array, electrical impedance variations in the subsurface beneath the sea bed can be detected by the receiver system. Data from the receivers can then be processed to obtain information about the subsurface.

While the description in this specification mentions the sea and sea bed, it is to be understood that these terms are intended to include inland marine systems such as lakes, river deltas, etc.

EM receivers for use in survey systems should be as sensitive as possible, in order to obtain as much information as possible about the subsurface. In particular survey situations or types of survey, receiver sensitivity is particularly important. There is therefore a need to improve the sensitivity of EM receivers.

It is therefore an object of the present invention to provide EM receivers suitable for sea bed logging, which are more sensitive than currently existing sensors based on conventional technology.

SUMMARY OF THE INVENTION

According to embodiments of the invention, there is provided an EM receiver suitable for making underwater electric field measurements, wherein the EM receiver comprises a dipole antenna; means for applying AM modulation to a signal detected by the antenna; a fiber-optic voltage sensor and means for applying AM demodulation to the signal.

In an embodiment, the fiber optic voltage sensor is an interferometric voltage sensor or a phase sensitive voltage sensor, and comprises an optimized transducer. The transducer may be a very high transduction efficiency cylindrical transducer, and may, in use, be operated close to its mechanical hoop resonance and electrical impedance series resonance.

The transducer may, for example, comprise a piezoceramic element or an electrostrictive element.

The EM receiver may further comprise signal feedback control means, for feedback between e.g. the output signal and the signal received at the receiver.

The invention also extends to a method of measuring electric fields underwater using an EM receiver suitable for making underwater electric field measurements, wherein the EM receiver comprises a dipole antenna; means for applying AM modulation to a signal detected by the antenna; a fiber optic voltage sensor and means for applying AM demodulation to the signal.

The invention provides a low noise fiber optic EM receiver suitable for detection of low frequency EM signals. In the conventional technology, solid state amplifiers are used to amplify the detected signal. The transistors used in these amplifiers have voltage and current noise that make important contributions to the total noise floor of the system. In the receiver of the present invention, the fiber-optic voltage sensor replaces the solid state amplifier. Such a sensor has good operating properties, for example, low equivalent voltage and current noise. The total system noise as compared to the conventional technology is thereby reduced.

The use, in the EM receiver of the present invention, of a very high transduction efficiency cylindrical transducer operating close to its mechanical hoop resonance and electrical impedance series resonance in combination with a coherent phase sensitive fiber optical technique, allows the sensitivity of the receiver system to be substantially increased. The transducer is preferably operated close to, but not exactly at, these resonance points.

BRIEF DESCRIPTION OF THE DRAWINGS

The invention is further exemplified with reference to the following figures, in which.

DETAILED DESCRIPTION

Figure 1:
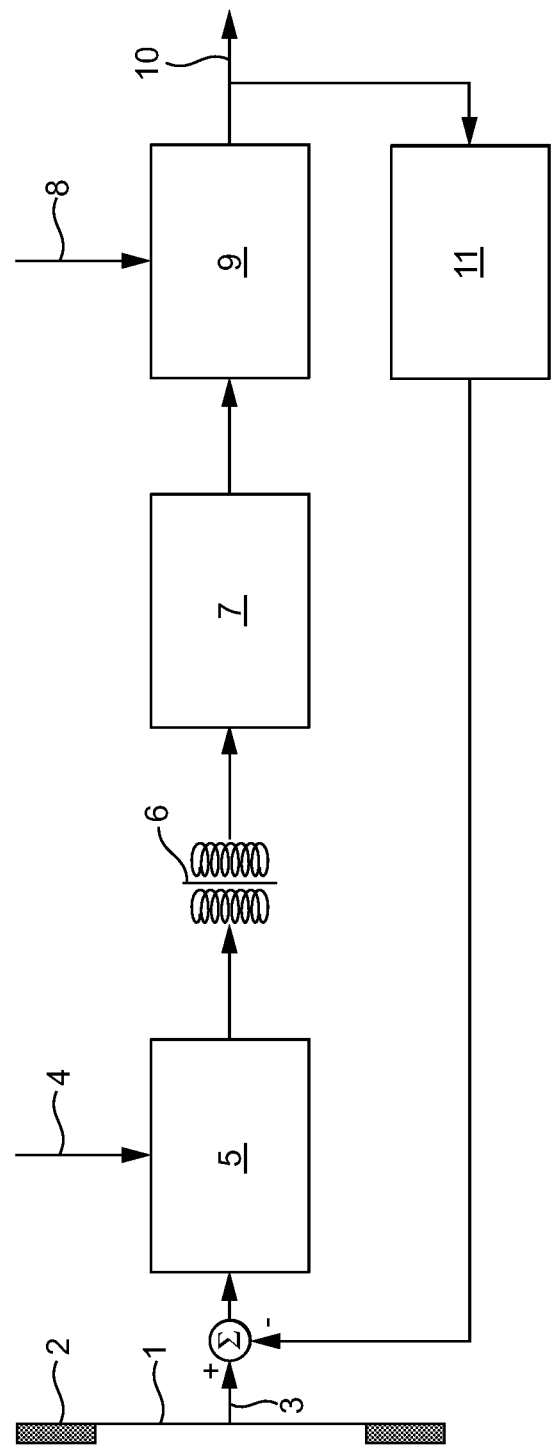
FIG. 1 shows diagrammatically an embodiment of a receiver according to the present invention.

An embodiment of the fiber optic electric field sensor is illustrated by the block diagram in FIG. 1. An incoming low frequency electric field is detected by an antenna (1), which is a dipole antenna consisting of two sensor elements (2) each with internal resistance $R_i/2$, which are exposed to the seawater and spaced by a predefined distance. The low frequency electric field is converted into a voltage signal (3) that is mixed with a high frequency modulation signal (4) using electronic modulation and mixing circuitry (5) to shift the low frequency signal to a high frequency signal in the kHz range. The mixed signal is input to the primary side of a transformer (6).

The secondary output of the transformer is input to a transducer element in an interferometric or phase sensitive fiber-optic voltage sensor (7). The fiber-optic voltage sensor includes means to apply phase demodulation or linearization to the signal. The output signal from this sensor is then demodulated by demodulation circuitry (9) using a signal (8) having the same frequency as the modulation signal (4), only adjusting phase and amplitude, resulting in a low frequency output signal (10) that is proportional to the low frequency incoming electric field signal of interest. Suitable modulation/demodulation means are known to those skilled in the art. The output signal (10) is subsequently further processed to obtain information about the subsurface.

To improve linearity and dynamic range of the system, the output signal can optionally be negatively fed back via control electronic circuitry (11). Such a feedback loop can also serve to increase the effective input impedance seen from the antenna.

The turns ratio of the transformer can be optimized to give a minimum total noise input voltage. Input noise can also be reduced through selection of an optimum frequency for the modulation signal (4), which in turn depends on the input resistance $R_i$ of the antenna, and also the input electrical impedance $Z_t$ of the transducer element included in the fiber-optic voltage sensor (7).

Figure 2:
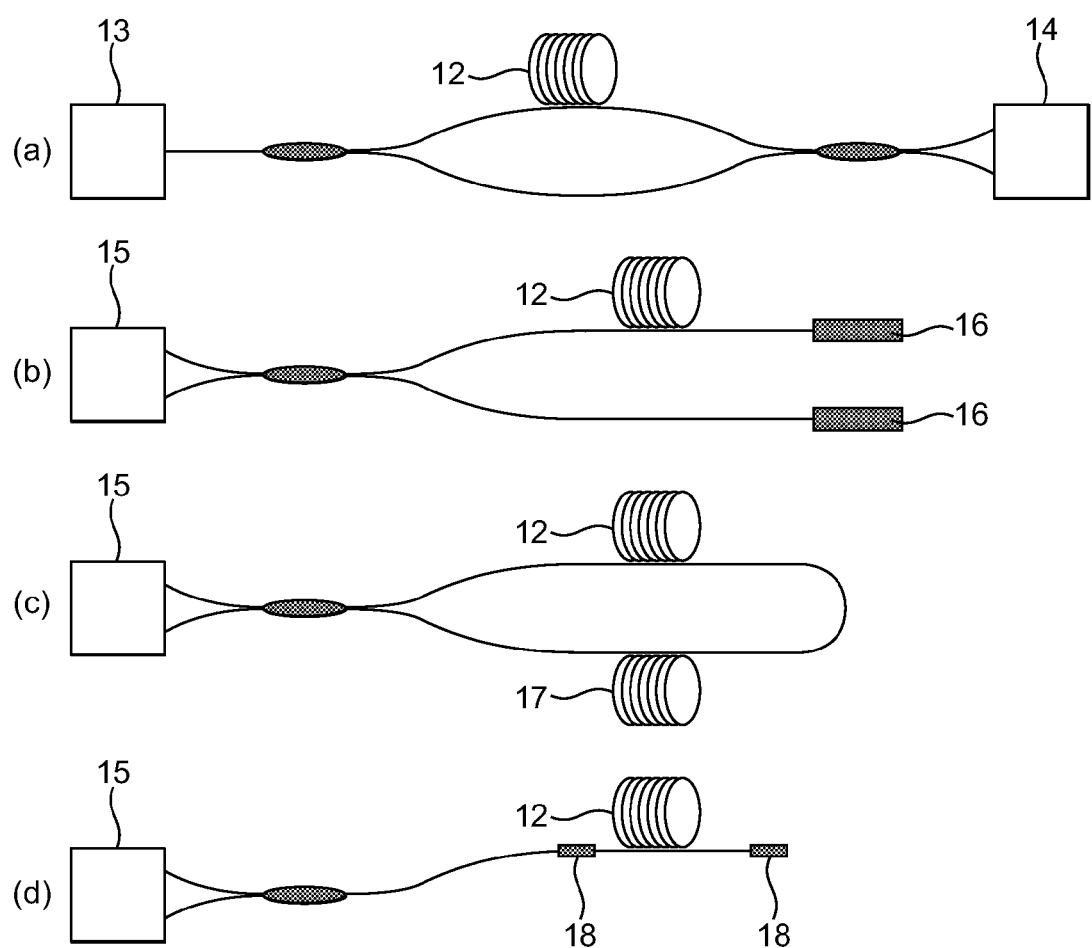
FIG. 2 shows a number of possible fiber-optic voltage sensor arrangements which may be used in the EM receiver of the present invention.

The fiber optic voltage sensor can be designed in a variety of different configurations, and FIG. 2 depicts four different interferometer configurations that can be used to detect the induced strain signal in a fiber optic transducer (12). The four example configurations shown in FIG. 2 are; (a) a Mach-Zehnder interferometer, (b) a Michelson interferometer, (c) a Sagnac interferometer and (d) a Fabry-Perot interferometer. The interferometer configurations of FIG. 2 variously include the following components: optical light source (13), fiber transducer element (12), photo detectors and demodulation circuitry (14), optical light source, photodetector(s) and demodulation circuitry (15), mirrors (16), fiber delay coil (17), and partly reflective mirrors (18). The electrical input signal applied to the electrodes of the fiber optic transducer (12) is the output voltage signal from the secondary side of the transformer (6) shown in FIG. 1.

Figure 3:
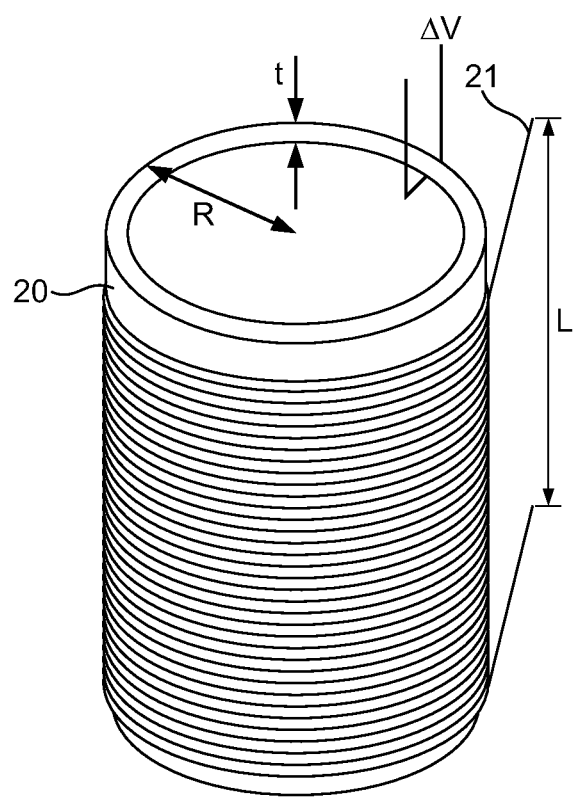
FIG. 3 shows an example of a transducer element which may be used in the present invention.

In FIG. 3, an example of a voltage to fiber strain transducer element is illustrated. In this case, a cylindrical transducer element (20) is shown having a mean radius R, thickness t and length L on which the optical fiber (21) is wrapped and attached onto the element. When a voltage signal ΔV is applied over the electrodes of the element, a change in radius will occur resulting in a length change in the optical fiber and this can be detected by the fiber optic interferometers shown in FIG. 2. A voltage to radius change can be obtained by using electrostrictive, or piezoceramic transducer materials. Electrostrictive materials for fiber-optic voltage sensors are mentioned in the art, for example U.S. Pat. No. 5,396,166 and U.S. Pat. No. 5,404,064, although the sensors described therein are not themselves suitable for use in an EM receiver for making underwater electric field measurements.

Figure 4:
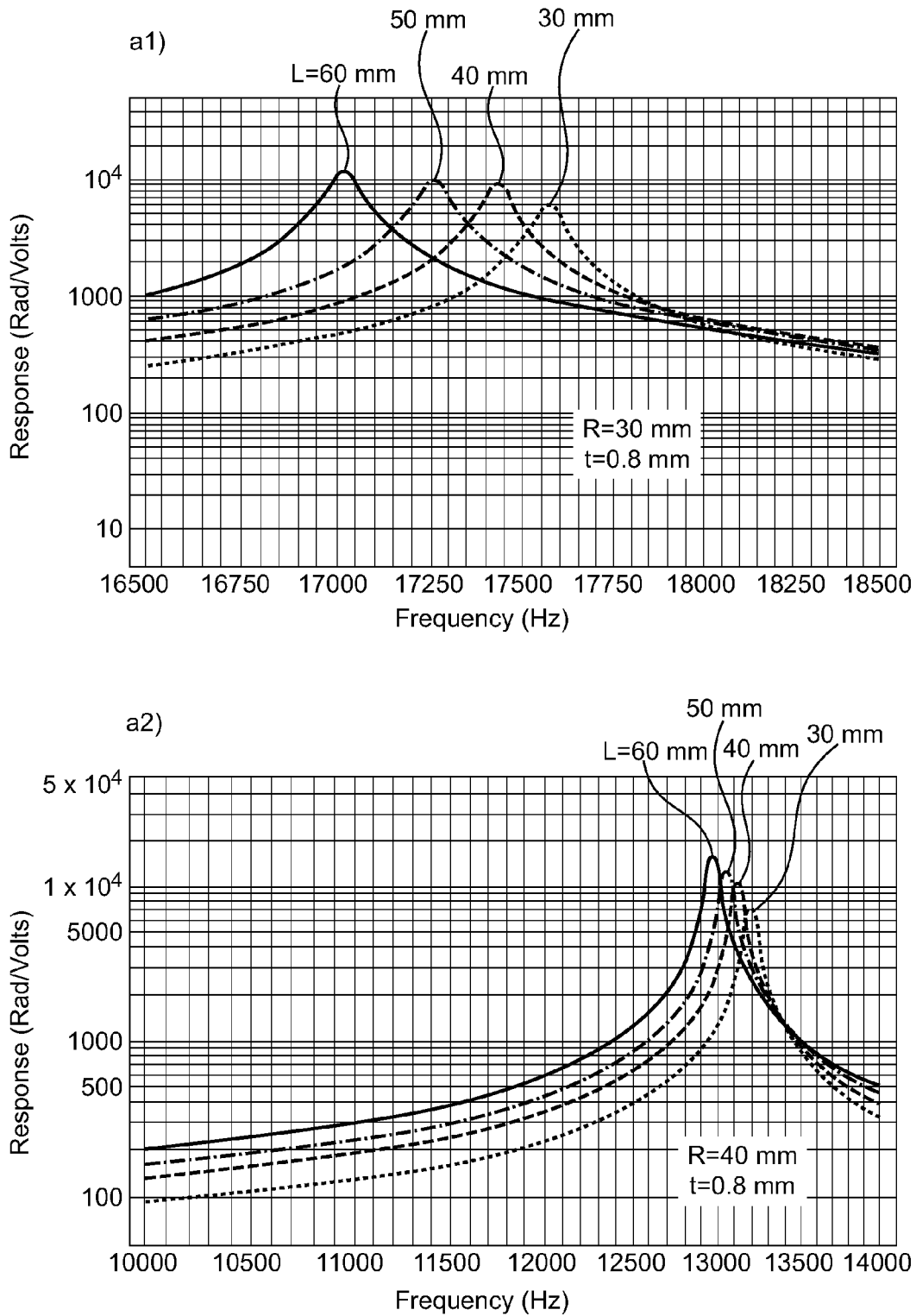
FIG. 4 shows modeling examples relating to relevant transducer elements.
Figure 4:
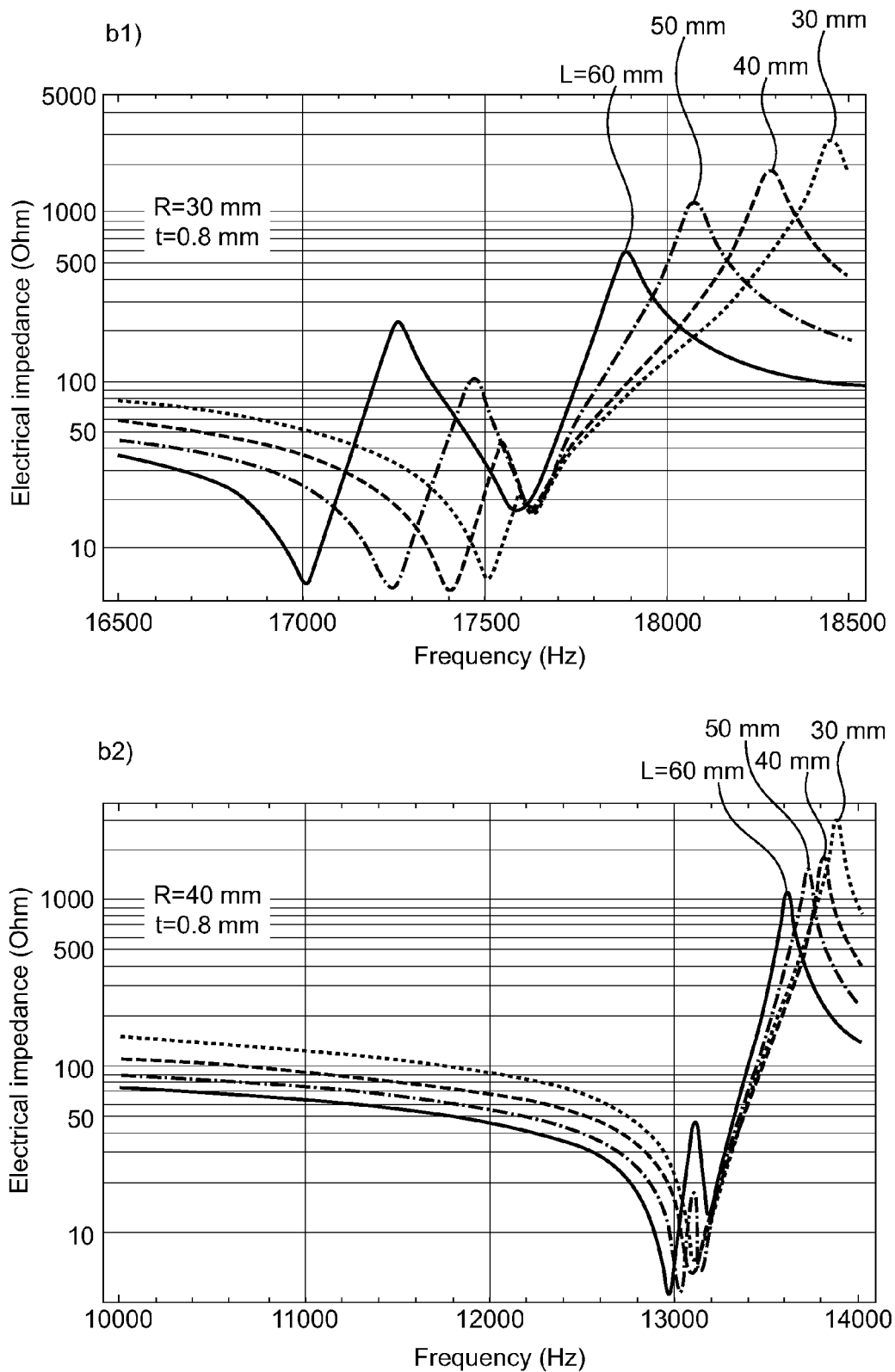

FIG. 4 shows modeling examples of both the electrical impedance change and the amplitude response of several cylindrical transducer elements close to the mechanical hoop resonance and electrical series resonance. These are examples of transducer elements which would be suitable for use with the present invention. For any given survey, the resonance frequencies of the transducer should be significantly higher than the target EM frequencies to be measured during the survey; in practice, the resonance frequency of a small cylindrical transducer would be expected to be much higher than the target marine EM frequency. In FIG. 4, Plots (a1) and (b1) show the amplitude and electrical impedance responses of a 60 mm diameter cylinder with thickness 0.8 mm of varying lengths L. Plots (a2) and (b2) show the amplitude and electrical impedance responses of an 80 mm diameter cylinder with thickness 0.8 mm of varying lengths L.

In these calculations it was assumed that a Michelson interferometer (see FIG. 2 for reference) was used, and the cylindrical transducer was constructed using a radially poled PZT-4D material. As shown from these plots, both the amplitude response and electrical impedance variations are large close to resonance, and therefore careful selection of AM modulation frequency ((4) in FIG. 1) is needed.

In general, selection of modulation frequency depends on the self noise in the fiber-optic voltage sensor ((7) in FIG. 1), the turns ratio N of the transformer ((6) in FIG. 1), the internal resistance $R_i$ of the antenna ((1) in FIG. 1) and the amplitude and electrical impedance responses of typical transducers, of which examples are shown in FIG. 4. The transducer can be operated close to the mechanical hoop resonance in order to achieve high gain, but is preferably not operated exactly at the resonance point, in order to retain system stability under variable conditions, for example under temperature variations.

Figure 5:
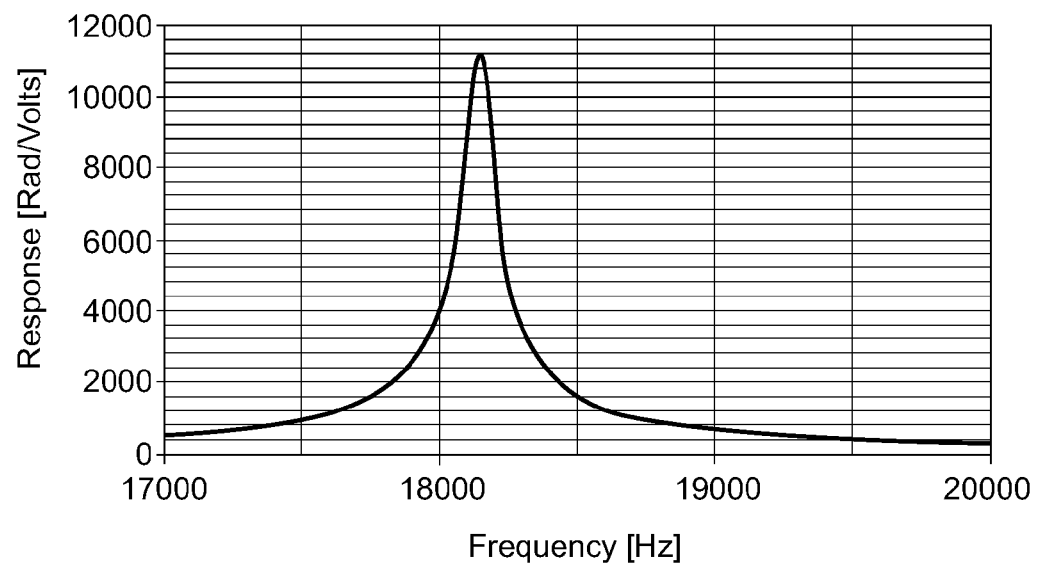
FIG. 5 shows measurement results for a given transducer element.
Figure 5:
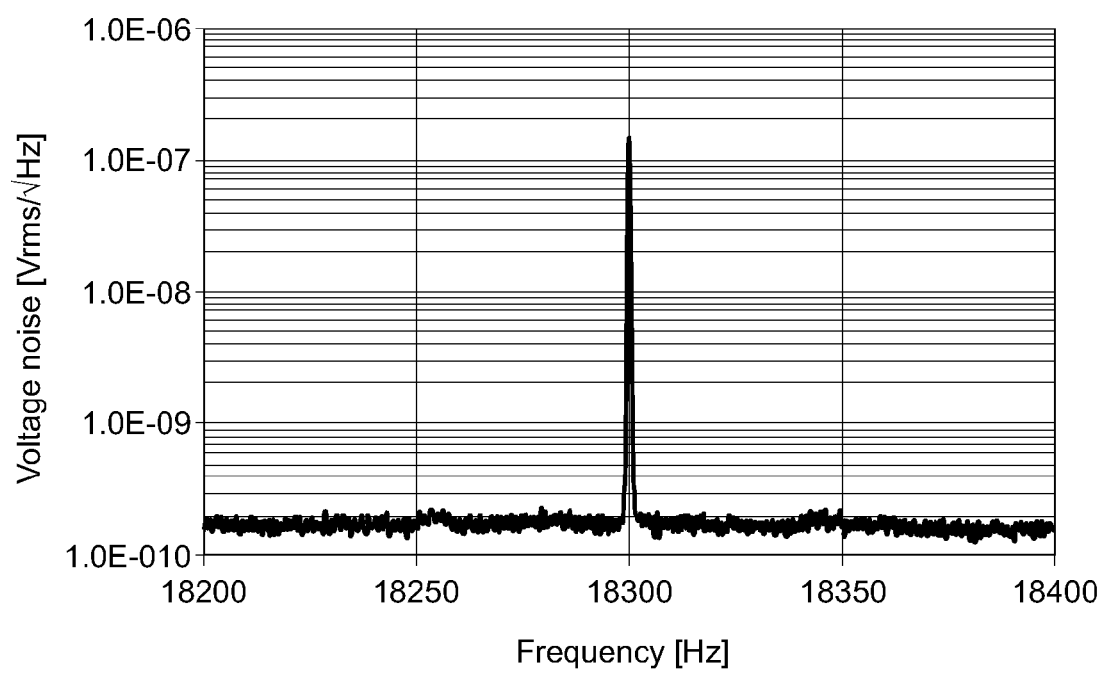
Figure 5:
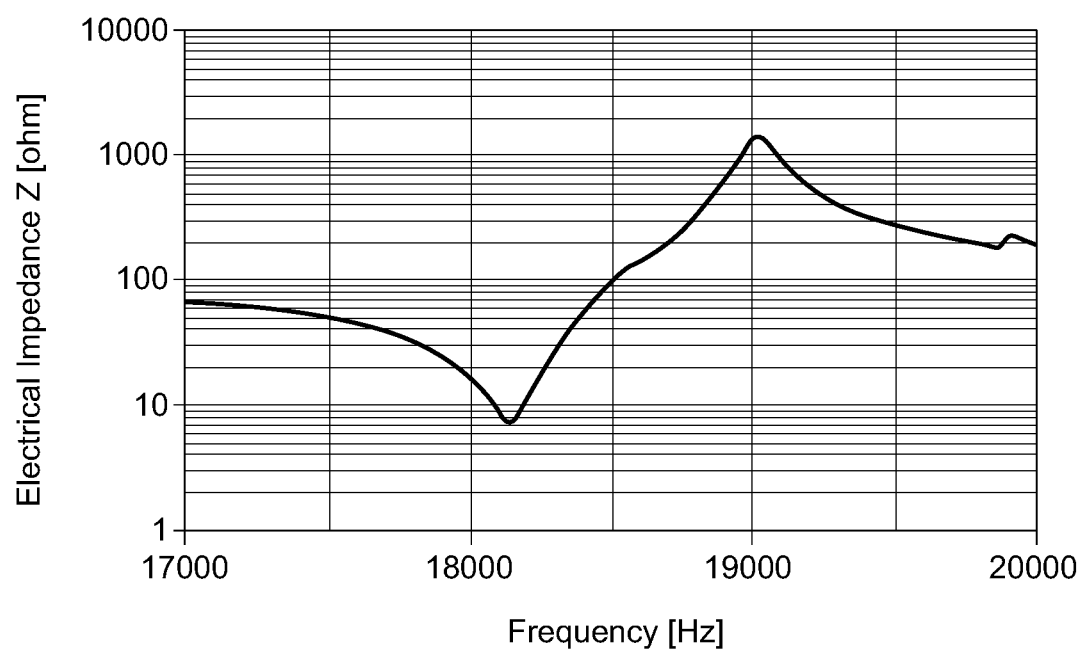

FIG. 5 shows measurement data for an optical fiber wrapped PZT cylinder with dimensions radius, R=28 mm, length, L=31 mm and fiber thickness, t=0.8 mm and material properties similar to the radially poled PZT-4D material. The upper left plot is the measured frequency response and the upper right plot is the measured impedance magnitude. The amplitude response and electrical impedance results are similar to the corresponding modeling examples shown in FIG. 4.

For the noise density measurement, $R_i$=1 Ω was used and a test sine signal close to the PZT resonance with amplitude 100 $nV_{rms}$ was applied. The lower left plot shown is the amplitude spectral density measured at the fiber optic demodulator output, but with units referenced to the signal input. The noise level shown is about 0.17 $nV_{rms}/\sqrt{Hz}$, where the Johnson noise from the 1 Ω resistor is the largest part at around 0.13 $nV_{rms}/\sqrt{Hz}$, and the noise from the rest of the sensor system is 0.11 $nV_{rms}/\sqrt{Hz}$. For comparison, current commercial solid state "off the shelf" low noise voltage amplifiers have voltage noise levels of around 1 $nV_{rms}/\sqrt{Hz}$ at 1 Hz.

This demonstrates that the fiber-optic sensor can be designed with a noise floor low enough not to present a significant contribution to the total system noise. The demonstrated noise level is low enough for the Johnson noise of a very low impedance receiver antenna, for example with $R_i$=1 Ω, to remain the dominant source of noise in the system.

The invention claimed is:

1. An EM receiver for underwater electric field measurements comprising;
    a dipole antenna for detecting a low frequency electrical field signal;
    modulation means operably coupled to the dipole antenna for receiving the low frequency electrical field signal and for applying AM modulation to the low frequency electric field signal to shift the low frequency electrical field signal to a high frequency signal in the kHz range;
    a fiber-optic voltage sensor adapted to receive the high frequency signal from the modulation means and;
    means operably coupled to the fiber-optic voltage sensor for applying AM demodulation to the high frequency signal in the kHz range resulting in a low frequency output signal that is proportional to the detected low frequency electrical signal.

2. An EM receiver as claimed in claim 1, wherein the fiber-optic voltage sensor is an interferometric voltage sensor, or a phase sensitive voltage sensor.

3. An EM receiver as claimed in claim 1, wherein the fiber-optic voltage sensor comprises a high transduction efficiency cylindrical transducer, which in use is operated close to its mechanical hoop resonance and electrical impedance series resonance.

4. An EM receiver as claimed in claim 3, wherein the transducer comprises a piezoceramic element.

5. An EM receiver as claimed in claim 3, wherein the transducer comprises an electrostrictive element.

6. An EM receiver as claimed in claim 1, further comprising a transformer.

7. An EM receiver as claimed in claim 6, wherein in use the transformer is optimized for minimum input noise voltage.

8. An EM receiver as claimed in claim 1, further comprising signal feedback control means, for feedback between the output signal and the low frequency electrical field signal received at the dipole antenna.

9. A method of measuring electric fields underwater, by use of an EM receiver according to claim 1.

10. An EM receiver for underwater electric field measurements comprising;
  a dipole antenna for detecting a low frequency electrical field signal;
  an AM modulator operably coupled to the dipole antenna for applying modulation to the low frequency electrical field signal to shift the low frequency electrical field to a high frequency signal in the kHz range;
  a fiber-optic voltage sensor adapted to receive the high frequency signal from the AM modulator and;
  an AM demodulator operably coupled to the fiber-optic voltage sensor for applying demodulation to the high frequency signal in the kHz range, resulting in a low frequency output signal that is proportional to the detected low frequency electrical signal.

11. An EM receiver as claimed in claim 10, wherein the fiber-optic voltage sensor is an interferometric voltage sensor, or a phase sensitive voltage sensor.

12. An EM receiver as claimed in claim 10, wherein the fiber-optic voltage sensor comprises a high transduction efficiency cylindrical transducer, which in use is operated close to its mechanical hoop resonance and electrical impedance series resonance.

13. An EM receiver as claimed in claim 12, wherein the transducer comprises a piezoceramic element.

14. An EM receiver as claimed in claim 12, wherein the transducer comprises an electrostrictive element.

15. An EM receiver as claimed in claim 10, further comprising a transformer.

16. An EM receiver as claimed in claim 15, wherein in use the transformer is optimized for minimum input noise voltage.

17. An EM receiver as claimed in claim 10, further comprising signal feedback control means, for feedback between the output signal and the low frequency electrical field signal received at the dipole antenna.

18. A method of measuring electric fields underwater, by use of an EM receiver according to claim 10.

* * * * *